(Model.)
E. W. NOYES.
SPRING KNEE BOOT FOR HORSES.
No. 246,543. Patented Aug. 30, 1881.
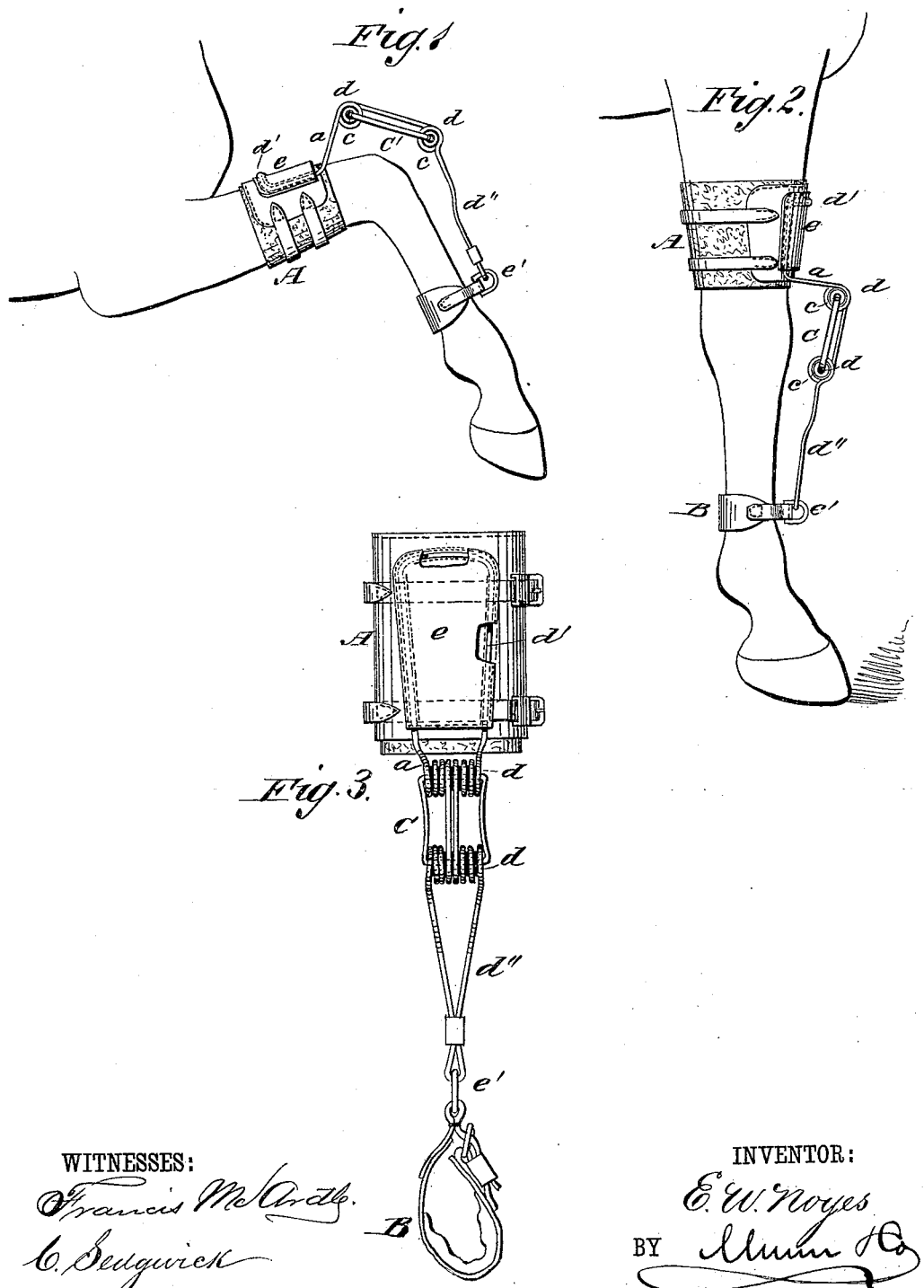

UNITED STATES PATENT OFFICE.

ERNEST W. NOYES, OF BAY CITY, MICHIGAN, ASSIGNOR TO CHARLES A. BURT AND ROBERT V. MUNDY, OF SAME PLACE.

SPRING KNEE-BOOT FOR HORSES.

SPECIFICATION forming part of Letters Patent No. 246,543, dated August 30, 1881.

Application filed March 14, 1881. (Model.)

*To all whom it may concern:*

Be it known that I, ERNEST W. NOYES, of Bay City, in the county of Bay and State of Michigan, have invented a new and Improved Spring Knee-Boot for Horses, of which the following is a specification.

The object of my invention is to provide a spring attachment or boot to be attached to the knees of horses for giving style to the action and gait of the animal, and for increasing his speed, and which at the same time tends to assist the horse in lifting his feet from the ground.

In the accompanying drawings, Figure 1 illustrates the position and action of my invention during the reach of the limb, and Fig. 2 the position of the same with the foot upon the ground; and Fig. 3 is a front elevation of my invention detached from the limb of the horse.

Similar letters of reference indicate corresponding parts.

A represents a broad padded belt or strap adapted to be secured, by buckling or otherwise, to the limb of the horse above the knee, and B represents another padded strap to be secured to the limb below the knee.

The spring D is preferably formed of the double coils $d\ d$, both formed of the same piece of wire, as shown, and having the upper and lower extensions, $d'\ d''$, which are secured by stitching, as at $e$, or by a link and ring, as at $e'$, or in any other suitable manner, to the belts A and B. The coils $d\ d$ should have the central core, $c\ c$, in them to stiffen the springs, and the coils should be linked together by the links C to prevent lateral bending of the parts of the spring. The upper extension, $d'$, of the spring should have the bend $a$ in it to carry the coils and the link C forward a suitable distance, as shown, so that the coils will not at any time come in contact with the knee of the horse. The strength of the spring may be adjusted by lengthening or shortening the belt B below the knee.

By this means the step and action of horses can be extended or contracted without danger of injury to the animal.

Having thus fully described my invention, I claim as new and desire to secure by Letters Patent—

The spring composed of the coils $d\ d$ and the extensions $d'\ d''$, in combination with the bands A and B and the link C, substantially as shown and described.

ERNEST WILLIAM NOYES.

Witnesses:
DANIEL MANGAN,
JOHN BROWN.